(12) United States Patent
Yatziv et al.

(10) Patent No.: US 7,672,509 B2
(45) Date of Patent: Mar. 2, 2010

(54) FAST IMAGE AND VIDEO DATA PROPAGATION AND BLENDING USING INTRINSIC DISTANCES

(75) Inventors: Liron Yatziv, Plainsboro, NJ (US); Guillermo Sapiro, St. Louis Park, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 974 days.

(21) Appl. No.: 11/415,804

(22) Filed: May 2, 2006

(65) Prior Publication Data

US 2006/0245645 A1 Nov. 2, 2006

Related U.S. Application Data

(60) Provisional application No. 60/676,920, filed on May 2, 2005.

(51) Int. Cl.
*G06K 9/36* (2006.01)
(52) U.S. Cl. .................... 382/167; 382/254; 382/311
(58) Field of Classification Search ................ 382/162, 382/167, 254, 260, 311
See application file for complete search history.

(56) References Cited

U.S. PATENT DOCUMENTS 4,476,487 A * 10/1984 Klie et al. .................... 358/531
5,506,946 A * 4/1996 Bar et al. .................... 345/600

OTHER PUBLICATIONS

Ahuja, R., "Faster Algorithms for the Shortest Path Problem", *Journal of the Association for Computing Machinery*, 37(2), (1990),213-223.
Ballester, C. , et al., "A Variational Model for P+XS Image Fusion", *Workshop on Variational and Level Set Methods*, (Oct. 2003), 8 pgs.
Burns, G., "Colorization", http://web.archive.org/web/20040614163021/ http://www.museum.tv/archives/etv/C/htmlC/colorization/colorization.htm, (archived Jun. 14, 2004), 2 pgs.
Caselles, V., et al., "Geometry and Color in Natural Images", *Journal of Mathematical Imaging and Vision*, 16, (2002), 89-105.
Chen, T., et al., "Grayscale Image Matting and Colorization", *Proceedings of Asian Conference on Computer Vision (ACCV 2004)*, (2004),1164-1169.
Chung, D. H. , et al., "On the Level Lines and Geometry of Vector-Valued Images", *IEEE Signal Processing Letters*, 7(9), (2000), 241-243.

(Continued)

*Primary Examiner*—Jon Chang
(74) *Attorney, Agent, or Firm*—Schwegman, Lundberg & Woessner P.A.

(57) ABSTRACT

Images are colorized, recolorized, or otherwise manipulated by adding scribbles of a blending medium (such as chrominance) to a measurement medium (such as luminance) of the image. The blending medium propagates from the scribbles according to an intrinsic or geodesic distance that is a function of the measurement medium. Intrinsic distances may be weighted. An effect scribble may produce an effect, such as result data, in the blending medium according to a predefined function. A preprocessing scribble may be converted to one or more effect scribbles which are then propagated. A measurement scribble may propagate so as to alter the intrinsic distances of other scribbles.

23 Claims, 9 Drawing Sheets

OTHER PUBLICATIONS

Danielsson, P., "Euclidean Distance Mapping", *Computer Graphics Image Processing*, 14(3), (1980), 227-248.

Dijkstra, E., et al., "A Note on Two Problems in Connection With Graphs", *Numerische Mathematik*, 1, (1959), 269-271.

Helmsen, J. J., et al., "Two New Methods for Simulating Photolithography Development in 3D", *Proceedings of the SPIE*, vol. 2726, *Optical Microlithography IX*, (Jun. 1996), 253-261.

Hertzmann, C. E., et al., "Image Analogies", *Proceedings of the 28th Annual Conference on Computer Graphics and Interactive Techniques (SIGGRAPH 2001)*, (Aug. 2001), 327-340.

Horiuchi, T., et al., "Colorization Algorithm for Grayscale Image by Propagating Seed Pixels", *Proceedings, 2003 International Conference on Image Processing (ICIP '03)*, (2003), 457-460.

Horiuchi, T., "Estimation of Color for Gray-Level Image by Probabilistic Relaxation", *Proceedings, 16th International Conference on Pattern Recognition*, (2002), 867-870.

Kao, C. Y., et al., "Fast Sweeping Methods for Static Hamilton-Jacobi Equations", *UCLA CAM Report 03-75*, ftp://ftp.math.ucla.edu/pub/camreport/cam03-75.pdf,(Dec. 2003), 20 pgs.

Kimmel, R., "A Natural Norm for Color Processing", *Proceedings of Asian Conference on Computer Vision (ACCV '98)* vol. 1, (1998), 88-95.

Kimmel, R., et al., "Regularized Laplacian Zero Crossings as Optimal Edge Integrators", *International Journal of Computer Vision*, 53(3), (2004), 225-243.

Levin, A, et al., "Colorization Using Optimization", *ACM Transactions on Graphics (SIGGRAPH 2004)*, (2004), 689-694.

Marshall, P., "Any Color You Like", http://photoqraphy.about.com/library/weekly/aa061002a.htm, (Jun. 11, 2002), 4 pgs.

Rane, S. D., et al., "Structure and Texture Filling-in of Missing Image Blocks in Wireless Transmission and Compression Applications", *IEEE Transactions on Image Processing*, 12(3), (Mar. 2003), 296-303.

Reinhard, E., et al., "Color Transfer Between Images", *IEEE Computer Graphics and Applications*, 21(5), (2001), 34-41.

Sapiro, G., "Inpainting the Colors", *IMA Preprint Series #1979*, Institute for Mathematics and Its Applications, University of Minnesota, Minneapolis, MN,(May 2004), 12 pgs.

Sethian, J. A., "A Fast Marching Level Set Method for Monotonically Advancing Fronts", *Proc. Natl. Acad. Sci. USA*, 93(4), (1996),1591-1595.

Sethian, J. A., "Fast Marching Level-Set Methods for Three-Dimensional Photolithography Development", *Proceedings of the SPIE*, vol. 2726, *Optical Microlithography IX*, (Jun. 1996),262-272.

Sýkora, D., et al., "Unsupervised Colorization of Black-and-White Cartoons", *Proc. of the 3rd International Symposium on NPAR '04*, Annecy, France,(Jun. 2004), 121-127.

Tsitsiklis, J. N., "Efficient Algorithms for Globally Optimal Trajectories", *IEEE Transactions on Automatic Control*, 40(9), (1995),1528-1538.

Welsh, T. , et al., "Transferring Color to Greyscale Images", *ACM Transactions on Graphics, Proceedings of the 29th Annual Conference on Computer Graphics and Interactive Techniques (SIGGRAPH '02)*, vol. 21(3), (2002),277-280.

Yatziv, L., et al., "Fast Image and Video Colorization Using Chrominance Blending", *IEEE Transactions on Image Processing*, 15(5), (May 2006), 1120-1129.

Yatziv, L., et al., "O(N) Implementation of the Fast Marching Algorithm", *IMA Preprint Series # 2021*, Institute for Mathematics and its Applications, University of Minnesota, Minneapolis, MN,(Feb. 2005), 9 pgs.

Zhao, H., "A Fast Sweeping Method for Eikonal Equations", *Mathematics of Computation*, 74(250), (2004),603-627.

\* cited by examiner

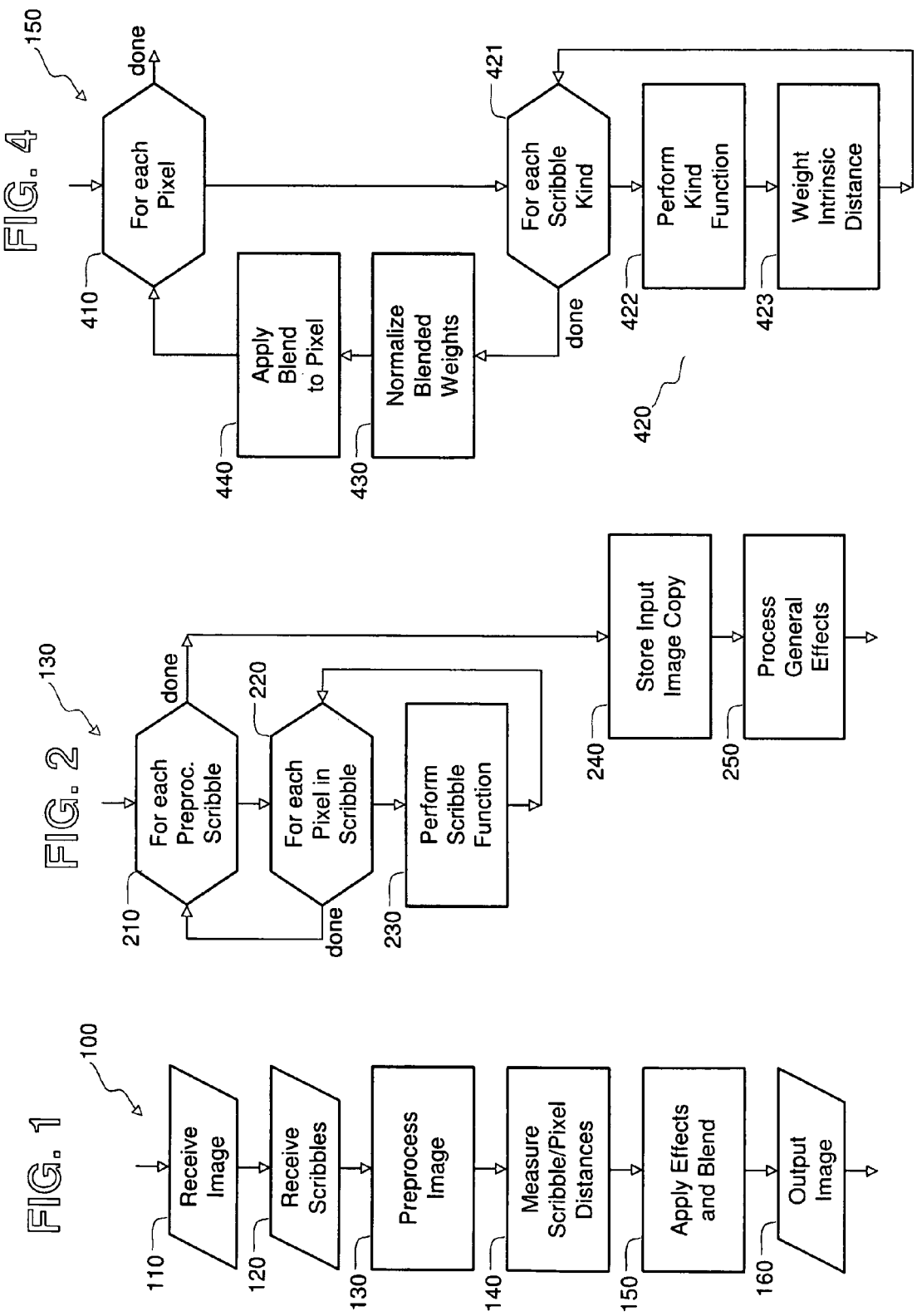

FIG. 5

```
class PriorityQueue {
    private LinkedList[] priorities= new LinkedList[256];

int minPriority=0;
    int minPriorityIndex=0;

public PriorityQueue() {
        for (int i=0; i<256; ++i) priorities[i]=new LinkedList();
    } public void add(int key, Object o) {
        int index=key-minPriority+minPriorityIndex;
        if (index>255) index-=256;

priorities[index].addLast(o);
    } public Object getFirst() {
        // Find the first non empty list
        int count=0;
        while(priorities[minPriorityIndex].isEmpty()) {
            ++minPriorityIndex;
            if (minPriorityIndex==256) minPriorityIndex=0;
            ++count;
            if (count==256) return null; // no more elements
        }
        minPriority+=count;

Object o=priorities[minPriorityIndex].removeFirst();

return o;
    } void reset() {
        minPriority=0;
        minPriorityIndex=0;
        for (int i=0; i<256; ++i) {
            priorities[i].clear();
```

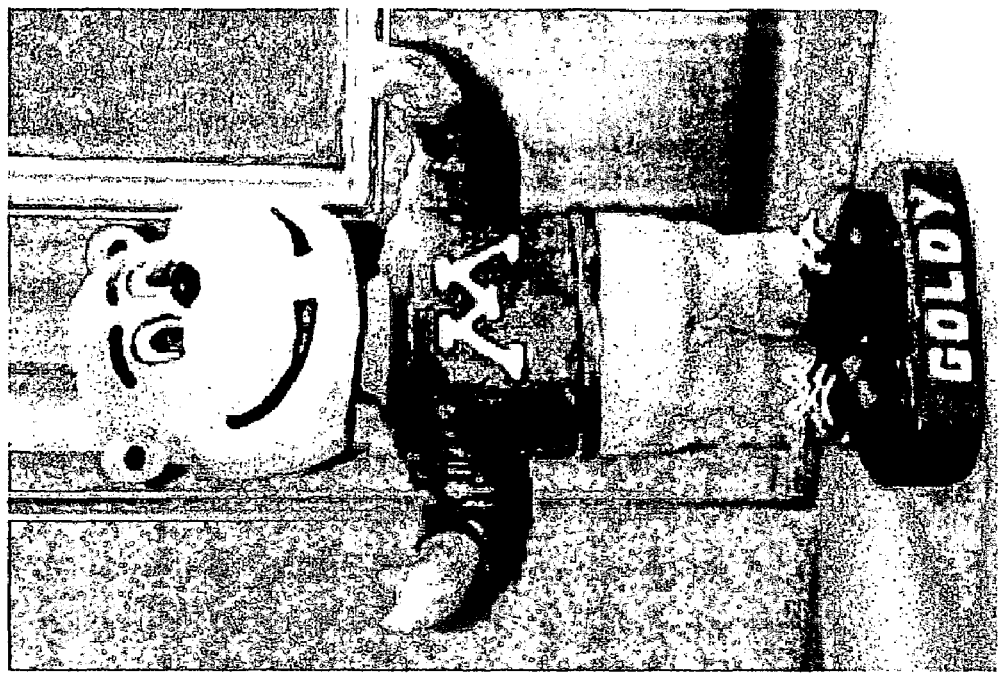
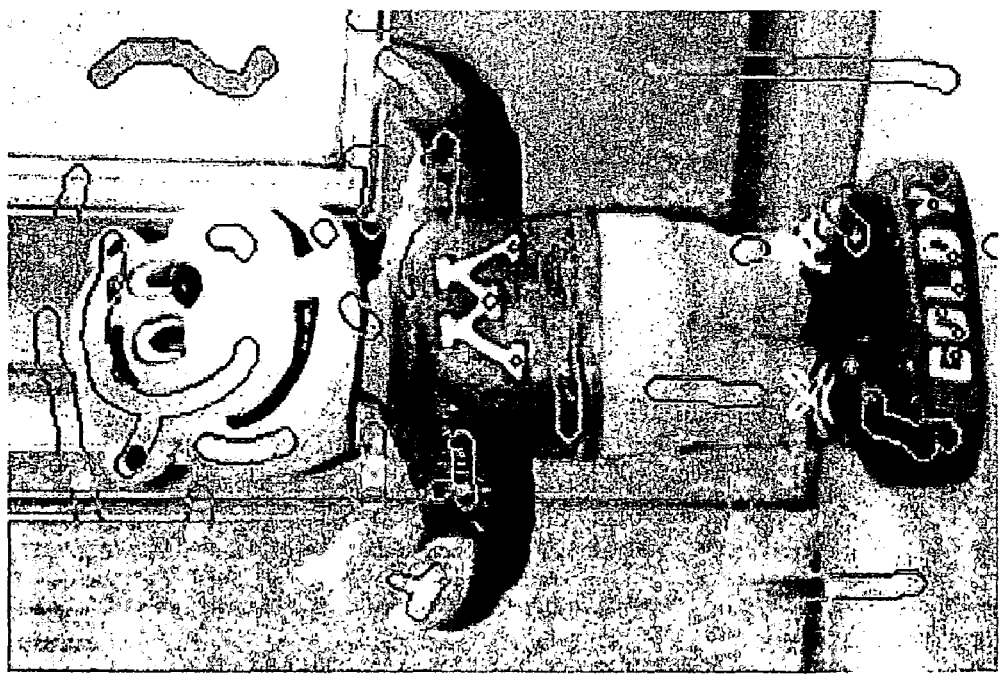

FAST IMAGE AND VIDEO DATA PROPAGATION AND BLENDING USING INTRINSIC DISTANCES

CLAIM OF PRIORITY

This Application claims priority to U.S. Provisional Application 60/676,920, filed May 2, 2005.

GOVERNMENT INTEREST

This invention was made with Government support under grant N00014-03-1-0176 awarded by the Office of Naval Research, support under CCF-0429037 awarded by the National Science Foundation, or support under grant HM1582-04-1-2023 awarded by the National Geospatial-Intelligence Agency. The Government has certain rights in this invention.

TECHNICAL FIELD

The subject matter of this application relates to processing digital images and video, and more particularly concerns manipulating images in accordance with user-supplied data.

BACKGROUND

Colorization is the art of adding color to a monochrome image or movie. The idea of coloring photos and films is not new. Hand coloring of photographs is as old as photography itself. There exists such examples from 1842 and possibly earlier. It was practiced in motion pictures in the early 1900s by the French Company Pathé, where many films were colored by hand. It was widely practiced also for filmstrips into the 1930s. A computer-assisted process was introduced in 1970 for adding colors to black and white movies.

Various early computer-based colorization techniques include straightforward approaches such as luminance keying. This method uses a user-defined look-up table which transforms gray-scale into color. Others extended this idea by matching luminance and texture rather than just the gray-scale values.

Manual segmentation has been employed to divide a gray-scale image into a set of layers and then to estimate an alpha channel using Bayesian image matting. The final image is constructed using alpha-blending. More recently, a segmentation method has been optimized for colorization of black-and-white cartoons.

Other approaches assume that homogeneity in the gray-scale image indicates homogeneity in the color. In other words, the geometry of the image is provided by the geometry of the gray-scale information. Often, in addition to the gray-scale data, color hints are provided by the user via scribbles in these methods. Probabilistic relaxation methods have been employed. Another researcher has solved an optimization problem that minimizes a quadratic cost function of the color difference between a pixel and its weighted average neighborhood colors. Another has proposed "inpainting" colors constrained by the gray-scale gradients and color scribbles that serve as boundary conditions. This method involves solving linear or non-linear Poisson equations.

The main shortcoming of these previous approaches is the intensive computational cost needed to obtain good-quality results. Some have addressed this issue with a faster algorithm that propagates colored seed pixels in all directions, where the coloring is done by choosing from a preselected list of color candidates. However, this method produces visible artifacts of block distortion, since no color blending is performed.

In addition to colorizing monochrome images, needs exist for recolorizing images that already contain color information. For example, advertisements may wish to emphasize products by showing a scene where only the product itself is in color. Sepia and related effects may create striking visual presentations. Online sales outlets may desire to allow a customer to visualize automobiles or clothing in different colors or styles on Web pages. Photographers may wish to selectively blend new colors with existing colors while retouching images. Beyond merely adding or replacing colors, photographers and artists commonly employ a number of effects or filters for manipulating images for various purposes.

Many of these applications are much more useful when images can be colored or manipulated accurately, with only a small input from the user, and quickly. Some applications are made practical only when the manipulation can be performed interactively in near real time—that is, within a time interval short enough that users can feasibly wait for the results and perhaps provide changes or comparisons without having to interrupt their thoughts or move to another task.

Video images as well as still may profit from such manipulation, especially where the user inputs could be applied to only a relatively small number of frames in a sequence. In the past, however, colorizing video images has required complex and slow techniques such as optical flow, which calculates a velocity field that warps one image into another, usually very similar, image in a sequence. Besides being slow in itself, optical flows generally require execution of an algorithm in addition to already slow image-manipulation algorithm.

SUMMARY

The present invention offers fast, accurate methods for manipulating images with relatively small inputs for adding or modifying a number of visual attributes, such as color. These inputs, called "scribbles," indicate the nature and location of modifications—or lack thereof—within the image or in successive images. Effects of the scribbles propagate to other locations of the image according to an intrinsic distance that is defined as a function of a preselected characteristic or property of the image called a measurement channel or measurement medium. The effects occur in another characteristic—or even in the same characteristic—of the image, called a blending channel or medium. Effects from multiple scribbles blend with each other according to their relative intrinsic distances from their respective scribbles, rather than according to linear distances or values of neighboring pixels. In many applications, scribbles of multiple types may produce different effects, and may be placed on the same image.

The invention further includes computerized systems and media for manipulating images.

DRAWING

FIG. 1 is a flow diagram of a representative method for processing an original inout image according to user-supplied scribbles.

FIG. 2 is a flow diagram detailing an example preprocessing stage from FIG. 1.

FIG. 4 is a flow diagram for a representative implementation of a blending stage of FIG. 1.

FIG. 5 illustrates example code for implementing a queue structure useful in FIG. 4.

FIGS. 7A-D are photographs of an example colorized image, showing comparisons with two prior-art colorization methods.

FIGS. 8A-B are photographs of a more complex example colorized image.

Figure 9A:
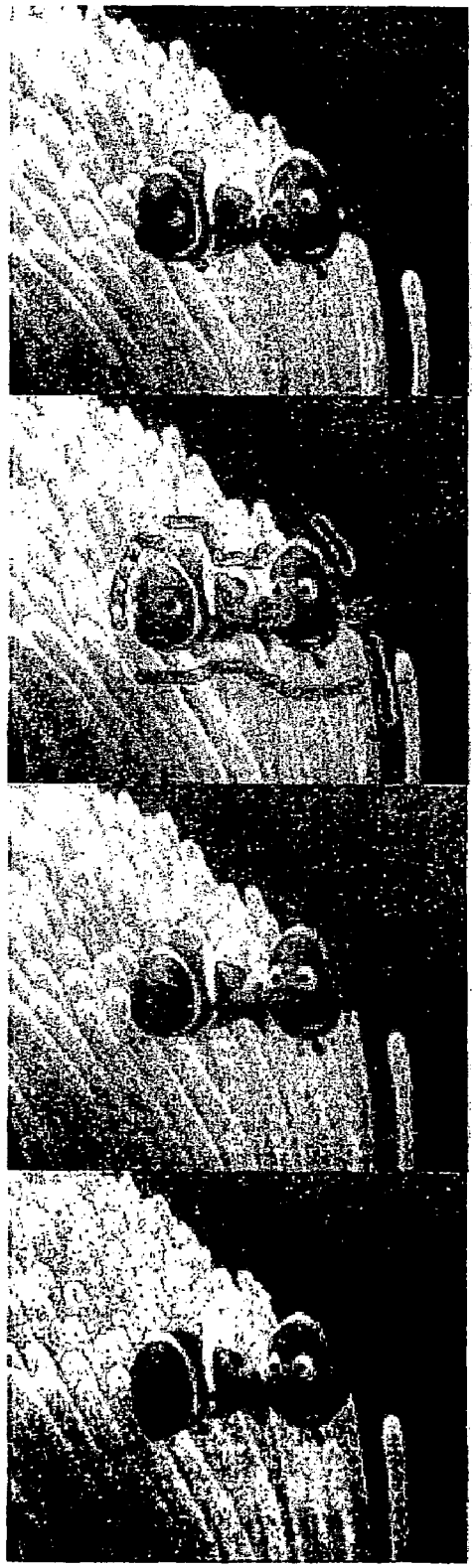
Figure 9B:
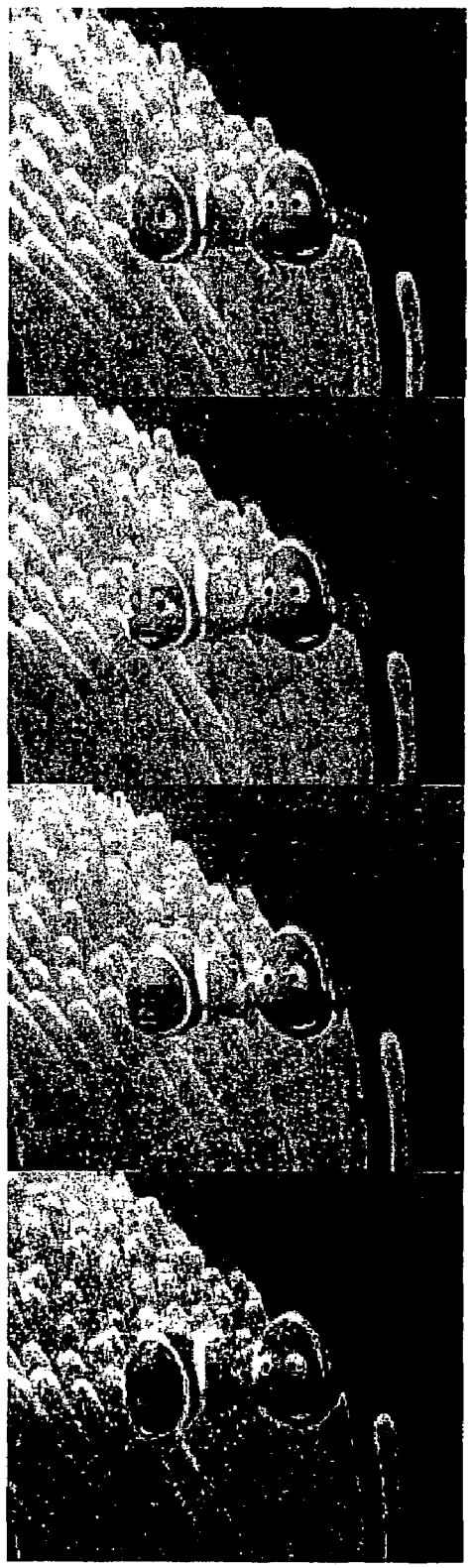

FIGS. 9A-B are photographs of frames from a colorized video sequence.

Figure 10B:
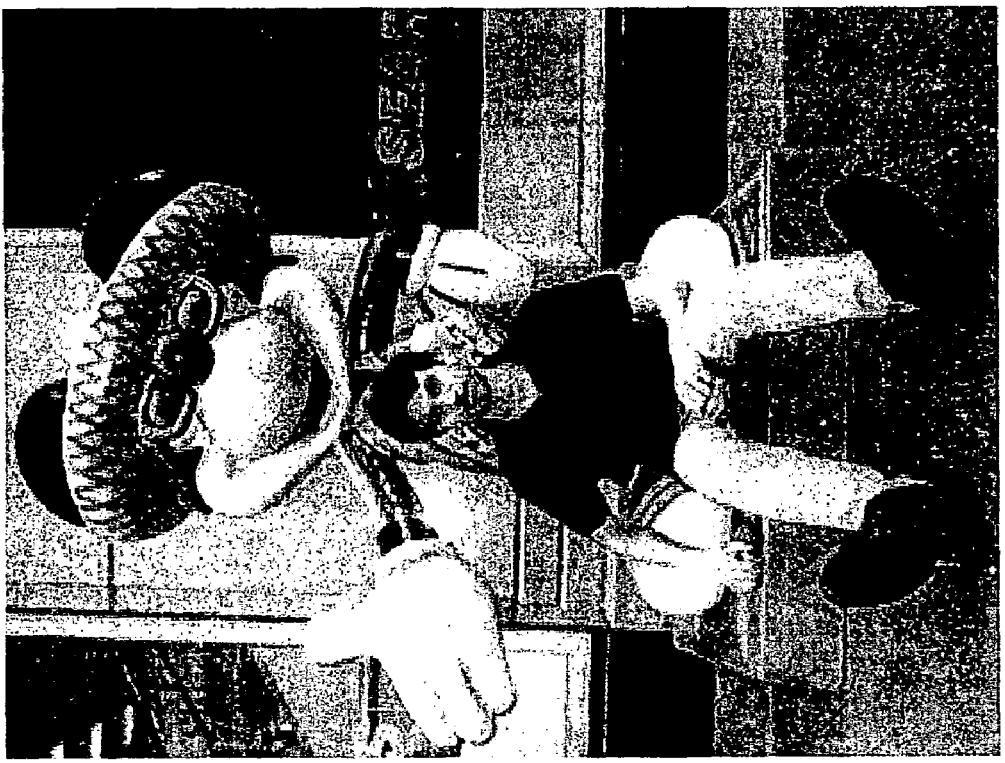
Figure 10A:

FIGS. 10A-B are photographs of a recolorized image.

FIGS. 11A-B are photographs of a selectively blurred image.

DESCRIPTION

Basic Colorizing

This section describes example methods where user markups or scribbles represent colors to be applied to still or video images. The techniques, however, are general, and apply to other image effects as well. This illustrative description employs the YCbCr color space, although other color spaces such as YIQ or YUV may be used instead. Moreover, work may also be done directly on the RGB space. Let $Y(x, y, \tau)$: $\Omega \times [0, T] \to \Re^+$ be the given monochromatic image (T=0) or video (T>0) defined on a region $\Omega$. Our goal is to complete the Cb and Cr channels $Cb(x, y, \tau)$: $\Omega \times [0, T] \to \Re^+$ and $Cr(x, y, \tau)$: $\Omega \times [0, T] \to \Re^+$ respectively. For clarity of exposition, we refer to both channels as the chrominance. The present technique also receives as input observed values of the chrominance channels in a region $\Omega_c \in \Omega$ which is significantly smaller than $\Omega$. These values are often provided by the user or received from other data.

Let s and t be two points in $\Omega$, and let C(p): [0, 1]→$\Omega$ be a curve in $\Omega$. Let $C_{s,t}$ represent a curve connecting s and t such that C(0)=s and C(1)=t. We define the intrinsic or geodesic distance between s and t by:

$$d(s, t) := \min_{C_{s,t}} \int_0^1 |\nabla Y \cdot C(p)| dp. \quad (Eqn. 1)$$

This intrinsic distance gives a measurement of how "flat" is the flattest curve between any two points in the luminance channel. The integral in the equation above basically integrates the luminance (Y) gradient in the direction of the curve C(p). When considering the minimum over all paths $C_{s,t}$, we then keep the one with the smallest overall gradient in this direction, which is thereby the flattest path connecting the two points s and t—that is, the path that goes from s to t with minimal overall gradient. The minimal path need not be unique. We only care about the intrinsic length d(s, t) of this path, so that non-uniqueness does not affect the algorithm. In other applications, Eqn. 1 may be modified to select image properties other than gradients as intrinsic distances; and image data other than luminance may serve as a measurement medium for image manipulation, as discussed in the next section.

Geodesic distances of this type can be efficiently and accurately computed using a number of available fast numerical techniques. For many applications, even simpler techniques such as a "best first one", such as in E. Dijkstra, "A note on two problems in connection with graphs," *Numerische Math.* 1, pp. 269-271 (1959), are sufficient.

Even though a mapping between luminance and chrominance is not unique, a close relationship between the basic geometry of these channels is frequently observed in natural images. Sharp luminance changes are likely to indicate an edge in the chrominance, and a gradual change in luminance often indicates that the chrominance is also not likely to have an edge, but rather a moderate change. Exploiting this assumption, a change in luminance should cause a related change in chrominance. Consequently, for the present colorization approach we assume that the smaller the intrinsic distance d(s, t) between two points (s, t), the more similar chrominance they would have. It is important to note that the goal of colorization is not to restore the original colors of images or scenes (which are in general not available in any event), but rather to produce visually pleasant and compelling colored images.

Since the chrominance data are often given in whole regions and not necessarily in single isolated points, we would like to get an idea of the distance from a certain known chrominance "scribbles" having a given uniform color to any point t in $\Omega$. We then define the intrinsic distance from a point t (to be colored) to a certain chrominance c, as the minimum distance from t to any point of the same chrominance c in $\Omega c$:

$$d_c(t) := \min_{\forall s \in \Omega_c : chrominance(s)=c} d(s, t). \quad (Eqn. 2)$$

This gives the distance from a point t to be colored to scribbles from the provided set $\Omega_c$ with the same color c. More generally, the purpose of an intrinsic distance is to measure a property of an image that determines how a feature indicated by a user or other input data is to be propagated from its location in the image to the rest of the image.

Our concept for colorization is to compute the Cb and Cr (chrominance) components of a point t in the region where they are missing ($\Omega \backslash \Omega_c$) by blending the different chrominance in $\Omega_c$ according to their intrinsic distance to t:

$$chrominance(t) \leftarrow \frac{\sum \forall c \in \text{ chrominances } (\Omega_c) W(d_c(t)) c}{\sum \forall c \in \text{ chrominances } (\Omega_c) W(d_c(t))}, \quad (Eqn. 3)$$

where chrominances($\Omega_c$) stands for all the different unique chrominance in the set $\Omega_c$, and W(•) is a function of the intrinsic distance that translates it into a blending weight. In words, the above blending expression assigns, to any point t to be colored, a color that is a weighted average of the different colors in the provided set of scribbles $\Omega_c$. For every distinct color c in the set $\Omega_c$, the distance to it from t is computed following Equation (2) (which uses Equation (1)), and this distance is used to define the weight of the color c at the point t—that is, the blending proportion of this color.

The function W (○) may have the following properties:

$$\lim_{r \to 0} W(r) = \infty$$

$$\lim_{r \to \infty} W(r) = 0,$$

$$\lim_{r \to \infty} W(r + r_0)/W(r) = 1, r_0 \text{ a constant.}$$

The first two requirements are obvious. The third is helpful when there are two or more chrominance scribbles close to each other, but the blending is done relatively far from all of them. The desired visual result would be an equal blending of all chrominances. In this example, we used $W(r)=r^{-b}$, where b is the blending factor, typically $1 \leq b \leq 6$. This factor defines the smoothness of chrominance transitions.

In theory, following the equations above, any point t to be colored will be influenced by all distinct colors c in $\Omega_c$, since $d_c(t)<\infty$.

When high speed or interactivity are desired, fast computation of intrinsic distances from Equation (1) becomes important. Geodesic distances of this type have been studied in the scientific computing community in general, as well as for specific technologies. Their popularity in other disciplines means that their efficient computation has been thoroughly investigated. Algorithms have been inspired by the classical Dijkstra graph algorithm (Dijkstra, above), fast sweeping techniques, and special data structures such as buckets and priority queues. For purposes of illustrating our algorithms, a straightforward, very fast, and accurate implementation involves using these fast techniques to compute, for every point to be colored t in $\Omega\backslash\Omega_c$, the distance $d_c(t)$ to every distinct chrominance c in the given $\Omega_c$, to obtain a set of weights needed for blending according to Eqn (3). We have found that many applications have little need to compute weighted distances as accurately as the abovementioned techniques; the simple classical Dijkstra algorithm is sufficient. Thus we create a graph where each image pixel is a vertex connected to its neighbors with edges that, following Equation (1), have weights equal to the absolute gray value derivatives between its neighbors. We then process this graph with Dijkstra's algorithm. Although more accurate distance computations might involve minimal additional cost, we have found that the increased accuracy is often not necessary to obtain high-quality results.

Table I below shows pseudo code that exemplifies one of the possible ways to efficiently implement a simple algorithm for Equations (1)-(3), based upon Dijkstra, above.

TABLE I

Input:
Gray-scale video/image.
List of observed pixels $\Omega_c$ and their chrominance (user provided scribbles).
  Output: Colored video/image.
  Definitions:
For each pixel in $\Omega$ a blend structure is created that contains:
    $\chi$ - list of chrominances (the chrominances that reached this blend)
    $\omega$ - list of distances (the corresponding intrinsic distance to each chrominance in $\chi$)
A link structure contains:
    ptr - pointer to a pixel (the destination pixel of the link)
    c - a chrominance (the chrominance the link attempts to transfer)
    d - distance (the intrinsic distance from the chrominance origin in $\Omega_c$)
  The basic algorithm:
    create an empty blend structure for each pixel in $\Omega$
    L ← ∅
    for each pixel p in $\Omega_c$
      let $c_p$ be the chrominance of the scribble in p
      create link λ
      (λ.ptr,λ.c,λ.d) ← (p,$c_p$,0)
      L ← L∪λ
    while L ≠ ∅
      λ ← the link with smallest distance in L (see Footnote (4)).
      L ← L\λ
      b ← the blend structure of λ.ptr
      if λ.c ∉ b.χ
        add λ.c to b.χ
        add λ.d to b.ω
        for all pixels q neighboring p
          create link $\lambda_q$
          ($\lambda_q$.ptr,$\lambda_q$.c,$\lambda_q$.d) ← (q,λ.c,λ.d + distance(p,q))
          L ← L ∪ $\lambda_q$
    for all pixels in $\Omega$; generate the chrominance channels by applying Equation (3) with the pixels' blend structures.

The described colorization algorithm has average time and space complexity of $O(|\Omega|\cdot|\text{chro min ances}(\Omega_c)|)$. The algorithm passes over the image or video for each different chrominance observed in $\Omega_c$ and needs a memory in the order of the number of different chrominances observed in $\Omega_c$ times the input image/video size. Although large numbers of scribbles may slow the algorithm or use more memory, this algorithm still appears to be more efficient than those previously reported in the literature.

Since humans perception of blending is limited, high blending accuracy is usually not necessary to obtain satisfactory results. Experimental results show that it is enough just to blend the most significant chrominance—that is, the chrominance with the closest intrinsic distance to its observed source. We found that in natural images it is enough to blend only the two or three most significant chrominances to produce satisfactory results. Such a relaxation reduces both time and space complexity to $O(|\Omega|)$, thereby becoming linear with respect to the amount of data. Therefore, we may discard from a blend those chrominances having weights in the blending equation that are small relative to the total weight.

Additional quality improvements may be achieved by using adaptive thresholds such as MacAdam ellipses, as presented in D. MacAdam, SOURCES OF COLOR SCIENCE (MIT Press, Cambridge, Mass., 1970). Any color lying just outside an ellipse is at a just-noticeable-difference (jnd) level, which is the smallest perceivable color difference under the experimental conditions. An adaptive threshold may filter out chrominances that if added to the blend would not cause a jnd.

Relaxations that limit the number of contributors to the blending equation impart a tight restriction on how far the chrominance may propagate and still be included in a blend. Such restrictions may be easily implemented, for example by adding conditions to the loop beginning at "if λ·c∉b·χ" in Table I.

Our approach is robust with respect to the scribbles placement—that is, the location of the set of scribbles $\Omega_c$. Assume that we know the ideal position to place a scribble. What happens if, instead of placing this scribble, we place a different one. If the ideal scribble and the different one are both inside the same object and the region between them is relatively homogenous, then our gradient weighted metric makes the distance between the two scribbles relatively small. From the triangle inequality, we can then bound the distance from the different scribble to a given pixel to be colored as the sum of the distance from the ideal scribble to the given pixel and the distance between the scribbles. Since the latter is small, the distance from the ideal scribble and the one from the different one to the given pixel are nearly equal, and the result of the colorization algorithm is little changed. If the different scribble is located across an edge, or with high gradients between it and the ideal scribble, then of course the distance between the ideal and the placed scribbles will be large and the algorithm will produce very different results. However, this misplacement indicates a mistake by the user. Moreover, the high speed of our approach often permits the user to correct errors and to add or move scribbles as needed in an interactive manner, without spending excessive time.

General Image Manipulation

The above section presents specific examples of a broader framework in which user-designated data, or effects based upon other data, may be propagated in an input image according to a geodesic or intrinsic distance over a selected aspect or medium of the image. The term "image" herein includes images of any dimension, video, and collections of data that may be presented or visualized in image format. Images can be 2D, 3D (for example, a stack of computed-tomography scan slices), or even 4D or beyond. An image may have a time coordinate as well. Example manipulations may include:

Colorizing, by creating color data based upon luminance data, as described above;

Recolorizing, by modifying image colors based upon luminance or previous colors;

Luminance manipulation, by modifying luminance based upon original luminance values;

Limiting image modifications to parts of an image, according to luminance or chrominance of the original image, or any other user-defined property or characteristic;

Adding depth to an image by provided and propagating just a few depth scribbles;

Adding motion to an image by providing and propagating just a few motion scribbles;

Blending multiple user-selected effects across an image.

Segmenting an object from an image/video/3D data.

Selective colorization, where color is retained in a certain object, but the rest of the image is transformed into a monochromatic or sepia color.

The generalized framework employs a number of terms and categorizations. The following topics explain these, and present some non-limiting examples. Categories are for ease of understanding, and may be modified. Descriptions may refer to different broad stages of an algorithm for transforming an input image to a final image.

An optional first stage of the algorithm may preprocess the input image. A second stage measures intrinsic distances, which depend upon image characteristics that define scribble propagation. A third stages applies scribble effects and blends their data to form a final image to be output. This last stage uses the intrinsic distances as guiding factors for blending.

A measurement medium or channel is an aspect, characteristic, property, or attribute of an input image upon which an intrinsic distance is measured. It may comprise one or more channels of data in the input image, and is usually—although not necessarily—an array. The measuring medium might also come from other images or tables that serve as side information to direct the process, such as a depth map, or from a computed tomography (CT) scan that corresponds to a magnetic resonance imaging (MRI) medical image. For colorizing, the channel of luminance data may be the measurement medium. Chrominance may constitute such a medium, for example in recolorization. (Chrominance may refer to one or more channels of data denoting color; for example, RGB data, individually or collectively, may be referred to as a chrominance channel.) Angle, reflection, optical flow, or depth may be employed as a measurement medium or channel. A measurement medium may be a product of an operation upon image data, such as an edge-detection, texture, or style filter. Measurement media may encompass a metric for interframe motion in a video image, such as optical flow. Other measurement media, and functions or composites of a medium, are also possible measurement media.

The term "intrinsic distance" refers to a metric for calculating a minimum distance between two pixels in the input image as a function of a selected measurement medium. For example, colorizing may employ a luminance channel of an input image. Gradients of the luminance data serve as a sort of topographic map for specifying an intrinsic distance along a surface of the luminance map from one pixel to another. However, intrinsic distances may measure image data or properties other than luminance, and they may employ characteristics other than gradients of those properties. The term "geodesic," which generally refers to a shortest path between two points on any mathematically defined surface, may be used as another term for intrinsic distance. The previous section describes a representative calculation of an intrinsic distance d(s,t) between two points s and t over a measurement medium Y.

For some purposes, the concept of a neighboring pixel is useful. A neighbor of pixel P is one that directly adjoins pixel P in the particular representation of a digital image. For still images, neighbors may directly adjoin in X and Y directions of a matrix; other neighborhoods could include diagonal pixels as well, or some other configuration. For video images, neighbors may adjoin from frame to frame in the time dimension according to optical flow or some other convenient metric.

"Local" distance from one pixel to a neighboring pixel in an image may assume different forms. A local-distance function specifies the representation of intrinsic distances from one pixel to the next in an image. A local distance function may be chosen to promote calculation speed. High accuracy is generally less important than speed in this context. Distance may be represented as a real number or as an integer, and may be defined on a coordinate system such as Cartesian. It may also be defined as (positive or negative) integers in only two directions on a finite grid, sometimes called Manhattan distance or taxicab geometry. When a finite grid is employed, rates of change of distance may also be limited to a bounded set of integers in the two directions. Known Dijkstra or fast geodesic computation techniques may also find utility here.

Calculation speed may also be enhanced with a "significance function" of an intrinsic distance. The function returns a logical TRUE value if a distance from a scribble is small enough to include the scribble's effect in a blend structure for an image pixel, and returns FALSE otherwise. A significance function has the further advantage of blocking data from propagating too close to a different kind of scribble. For example, if the intrinsic distance of a candidate scribble is more than three times the intrinsic distance of the closest scribble to a particular image pixel, then data from the candidate scribble may be discarded from the blend for that pixel. Alternatively, the function may measure the change of the resulting blend that would occur by adding a candidate scribble. If the change would be insignificant, then the candidate scribble may be discarded from the blend, and not propagated further from that point. This function may require knowledge as to how blending is done, but distance estimates are usually sufficient, and the runtime speed is increased.

A blending medium or channel is an aspect, characteristic, property, or attribute that is supplied as result data from scribbles. It may comprise one or more channels of data, which might or might not be present in the original image. For example, color scribbles may produce a chrominance channel in a monochrome image having only a luminosity channel (for colorizing); or they may modify a chrominance channel already present in the input image (for recolorizing). The algorithm produces result data in the blending medium to form the final output image.

A scribble or hint comprises data supplied by a user or some other source to guide blending of the blending medium in forming a final image. A scribble occupies an area or location of the input image. It may be a single pixel or a region of any shape and size; in video images, it may also have a time dimension. A scribble may overlap other scribbles. Scribbles may be thought of as constraints, either hard or soft. The illustrative algorithm described below treats each pixel of a scribble as if it were a separate scribble.

Scribbles may be divided into different kinds. Different kinds of scribbles have different functions for producing a result in the blending algorithm. Scribbles of the same kind supply the blending algorithm with the same type of information, but at different locations of the image. For example, two brown color scribbles are of the same kind, but a green scribble has a kind different from a brown scribble. For efficiency, the processing algorithm may limit the number of different kinds that may participate in a blend at any single pixel.

For organizational purposes, scribble kinds may be divided into four broad categories or classes, generally according to where their results are produced in the algorithm.

Scribble kinds that belong to a result-data class represent different values of result data. For example, a color scribble for simple colorizing specifies a particular color or chrominance value to be propagated to and blended over other areas of an input image. Depth or intensity may be specified in a blended scribble to generate a depth map or an intensity or luminance channel over an image. Scribbles of the result-data class are intuitively simpler than those of other classes, and may be considered to be a simple case of effect class scribbles. The illustrative algorithm described herein processes both result-data and effect scribbles in the same way, as though they were of the same class.

Scribble kinds that belong to the effect class contain data that represent an image-processing operation directly or indirectly related to the measurement medium. Although an effect scribble may generate result data earlier in the algorithm, the generated data take effect only in the final blending stage of the algorithm. An example is a neutral scribble, also called a white scribble. The result of neutral scribbles is to neutralize the effects of other scribbles. That is, neutral scribbles propagate to other image pixels according to their intrinsic distances, but the effect of the neutral scribbles is to function as a mask that reduces the effects of changes to the original image colors from result-data scribbles. Another scribble in the effect class is a palette scribble. Such scribbles apply different colors or chrominance values from a certain palette according to the measurement medium of the image pixel. Other effect-scribble kinds may perform functions generally classed as filters or effect filters in graphics programs. For example, a blurring scribble may blur the input image progressively more weakly from the scribble, according to intrinsic distance based upon a measurement medium such as luminance. Other such scribbles may sharpen the image or add sepia, embossing, texture, or other styles to the image.

Scribble kinds that belong to a preprocessing class operate before the measurement stage begins. Preprocessing scribbles generate result-data or effect scribbles in the same image location as that of the preprocessing scribble. Thus, the measurement stage never receives the preprocessing scribbles themselves, but only corresponding result-data or effect scribbles. Copy scribbles, for example, copy data underlying the same position as the copy scribbles in the original image. For recolorizing applications, preprocessing converts each pixel of copy scribbles into separate color scribbles having the same chrominance as that of the image pixel at that position. These color scribbles—which are actually a kind of result-data scribble—propagate over the image in the normal fashion, but at a later stage of the algorithm. Black scribbles, described below, may operate as masks. Another example of a scribble kind of this class may generate palette scribbles according to underlying color statistics.

Scribble kinds that belong to a measurement class are effectuated only in the measurement stage of the algorithm. Unlike those of the other classes, measurement scribbles produce no data that propagates or blends. Rather, they operate upon or modify intrinsic distances, to affect how data from other scribbles propagate across the input image. For example, directional scribbles may penalize or enhance propagation only in a specified direction of the image. Such a directional penalty may be a hard constraint specified by the user, or it may be a soft constraint that varies with the underlying measurement data. (In this type of scribble, the "lending channel" may be considered the same as the measurement channel.) Boundary scribbles decrease the propagation of other scribbles through their boundaries, either when entering or when exiting scribbles through them. Hard boundaries stop all propagation; that is, they effectively increase the intrinsic distance from other scribbles to an infinite value. Soft boundaries extract a propagation penalty by increasing intrinsic distance values. The penalty may be an interpolation of the measurement medium. For example, a boundary scribble that detects an edge in the image may penalize only that edge, rather than the entire scribble area. Boundary scribbles may be placed to prevent color from bleeding into an image area that has no edge or luminosity gradient. Easer or enhancement scribbles are essentially negative boundary scribbles. They enhance data propagation through them, by decreasing effective intrinsic distances.

Result data is the data type that results from the application of a blending algorithm to image data for an attribute, characteristic, property, or data channel that is to be modified in the image. This image data may be a further channel added to the original input image, or it may already exist in the input image. For example, colorizing employs chrominance data or channels as the result data type. Other examples include luminance or intensity, depth maps, angle data, transparency data, or reflection data. Result data are calculated in accordance with intrinsic distances from the measurement medium.

Blend weight is calculated from intrinsic distances between a scribble pixel and another arbitrary pixel in the image. Although the effects of different scribbles upon a given image pixel could vary in direct proportion to their intrinsic distances, the distances may be weighted according to a desired weighting function. As described below, a weighting function may comprise $W=r^{-b}$, where r is the intrinsic distance and b is a parameter; in one example, b=4. Another possible distance weighting function is $W=e^{-br}$. It is also possible to use multiple different distance weighting functions concurrently for different purposes, such as for different kinds of scribbles.

The combination of the different types of scribbles and different types of measurements and blends provide a rich framework for a large number of image-modification tasks, beyond mere colorization and recolorization of still or video images.

ILLUSTRATIVE EMBODIMENTS

FIG. 1 outlines an example an algorithm or method 100 for processing an input image according to user-supplied scribbles or hints to produce a final output image.

Block 110 receives an input digital image, usually in the form of one or more arrays of pixels having certain channels of data for each pixel. As noted earlier, the image may include only one channel, such as luminance data, or it may include multiple channels, such as luminance, chrominance, depth, transparency, and so forth. Video images may include channels such as optical flow. Block 110 may also display the input image to a user.

Block 120 receives scribbles from the user. The user may draw scribbles with an input device, such as a mouse, graphics tablet, or touch screen, directly on a display of the input image if desired, specifying different types of scribbles by keyboard selection or other means. Block 120 may display the scribbles directly on the input image. Different kinds of scribbles may be displayed differently for tracking by the user. Different media (e.g., brush width or scribble shapes) may be simultaneously used to input the scribbles. Block 120 may also store the image locations and types of the scribbles in one or more appropriate data structures. Scribbles may additionally be input from other images. For example, a set of prespecified scribbles may be used for multiple images, or user-defined scribbles from one frame of a video may serve to colorize a different frame. Input data for scribbles may originate from sources other than images.

In another application, the invention may be used to implement a form of lossy image compression. Instead of storing a full color image, a gray-scale image version may be stored with an automatically generated list of single-pixel scribbles for subsequently recoloring the image.

Block 130 represents an optional preprocessing stage of method 100. Stage 130 converts scribble kinds of the preprocessing class into scribble kinds of other classes, which will be acted upon in subsequent stages.

Stage 130 may also perform general image-processing functions, automatically or as specified by a user, to produce a modified image from the original image. For example, a median filter may perform a denoising operation upon the input image, or edge enhancement. In this implementation, the modified image is used only for measurement purposes in block 140; block 150 always employs the original image. The functionality of block 130 is required only if preprocessing scribbles are input from block 120, or if a general image-processing function is selected. If the original image is needed as part of the result (such as for colorizing the luminance channel), block 130 may store an unprocessed copy of the input image.

Block 140 represents the measurement stage of the algorithm, which calculates intrinsic distances from each scribble to pixels in the input image, including any alterations due to scribbles of the measurement class.

Block 150 applies blending effects and blends the appropriate result-data type from each scribble of the effect class to determine values of each pixel in the final image in each relevant channel—luminosity, chrominance, transparency, etc. One or more channels, such as luminosity, may remain the same in the final image as they were in the original input image.

Block 160 outputs the final image. This final image may be stored, displayed, printed, transmitted, or further manipulated as desired. For example, the final image may go through a post-processing operation such as adding granularity noise.

FIG. 2 expands an example preprocessing stage 130. Stage 130 receives data from scribbles of the preprocessing class, and functional code for carrying out all defined kinds of preprocessing scribbles. Loop header 210 selects each preprocessing scribble in turn. When all such scribbles have been processed, it returns all preprocessing scribbles as scribbles of the effect class. For example, the chrominance value of each pixel in a copy scribble is replaced by the chrominance value of the pixel at the same location in the input image.

Loop header 220 processes each pixel in the current preprocessing scribble. Code in block 240 generates a new scribble of another class for the pixel location according to a function defined for that scribble kind.

Block 250 performs general processing effects on the input image, such as denoising. This is important for example for processing noisy images such as old pictures or films. Processing effects may be executed before blocks 210-240, as well as afterward. Because block 250 may produce a modified image, block 240 saves a copy of the original input image for use by other stages, such as 150 or 160.

Figure 3:
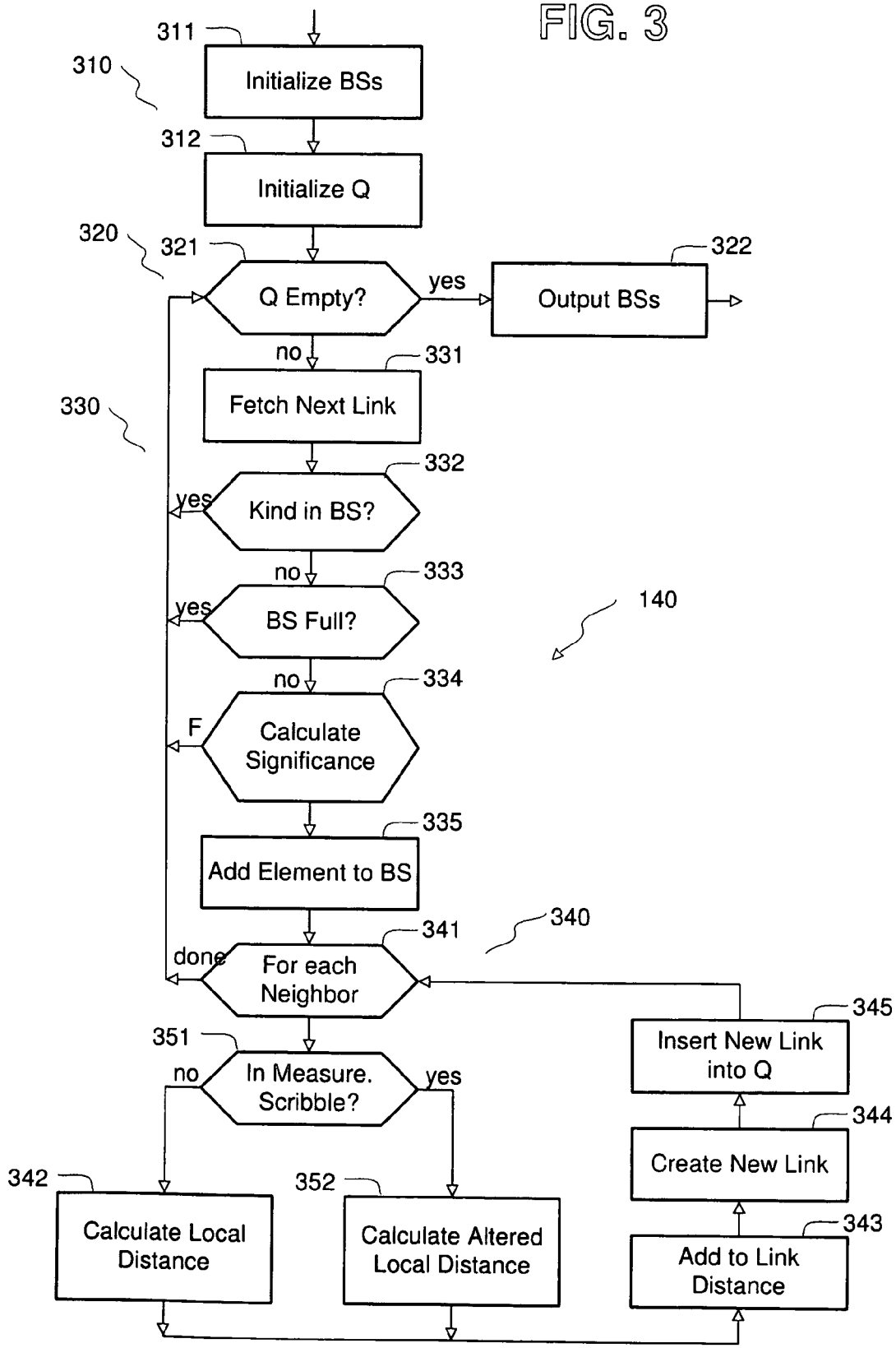
FIG. 3 shows the calculation of intrinsic distances for the method of FIG. 1.

FIG. 3 details an example procedure 140 for calculating intrinsic distances for blending stage 150.

In initialization blocks 310, block 311 initializes the blend structures (BSs) of all pixels to be empty. In a 2D input image, the location $L_P$ of each pixel may be specified by its {x,y} coordinates in an array. The blend structure BS for each pixel has a variable number of elements, initially none. Each element has two entries. The first entry designates one of the kinds of scribbles present in the image. In this embodiment, a single kind is eligible for inclusion only once in a single blending structure; the algorithm guarantees that the scribble that is included is the closest one of its kind to the current image pixel. The second entry contains the intrinsic distance $L_D$ of that pixel a scribble of that kind. The intrinsic distance to a multi-pixel scribble of that kind may be taken as the intrinsic distance to the closest pixel of the scribble to $L_P$.

Initialization block 312 creates a priority queue Q initially having a link for every image pixel that is part of each scribble of the effect class. Because a single image pixel may be included in more than one effect scribble, a single image pixel may have multiple links. One entry of each link is initialized to point to the image pixel location $L_P$. Another entry contains a code designating the kind $L_K$ of the scribble. The third entry contains the intrinsic distance of the pixel $L_D$ from the scribble; this value is initialized to zero. (The distance of another pixel within the same scribble will remain zero.) The links are arranged in priority order according to their distance entries $L_D$; larger distances have lower priorities. The queue may assume a number of different forms, including a binary or k-ary heap, a binomial, Fibonacci, or other heap, a bucket sort, or a calendar queue. Details of one specific implementation will be described in connection with FIG. 5, where the queue Q may have a number of buckets, and may be cyclic.

Output blocks 320 terminate measurement stage 140. When block 321 finds that queue Q is empty, all links have been processed. Block 322 then outputs the completed blend structures for all scribble pixels to the next stage.

Blocks 330 process a link in the queue. As long as the queue is not empty, block 331 fetches the next link, removing it from the queue. Because Q is a priority queue, the links are fetched in order of increasing distance $L_D$. If a scribble of the same kind $L_K$ already resides in the blend structure for that particular image pixel, block 332 returns control to loop head 321 without further processing. Preventing multiple scribbles of the same kind avoids loops in the algorithm.

Several tests optionally speed up computation at the expense of small, usually acceptable, and often not noticeable, accuracy penalties. Stage 140 may include an arbitrary maximum size limit for the number of kinds that can participate in a blend. Block 333 detects whether this limit has been reached, and return control to loop head 321 if the blend is already full. Block 334 tests the pixel against an optional significance function, described earlier. This function returns a FALSE value if the pixel distance exceeds an arbitrary threshold. In that case, the effect of a blend would be imperceptible, and control returns to block 321.

If tests 332-334 are successful, block 335 adds the values of $L_K$ and $L_D$ from the current link as a new element in the blend structure of the current pixel $L_P$.

Blocks 340 create links that attempt to propagate the same scribble kind $L_K$ to neighbors of the current image pixel. Block 341 selects each neighbor in turn of an image pixel. Block 342 calculates the local distance of that neighbor according to the measurement medium, according to a local distance function as described above. Block 343 adds the local distance between the neighbor and the current pixel to the $L_D$ value of the current pixel, taken from its link 331. Block 344 then creates a new link containing the $L_P$ of the neighbor pixel, the $L_K$ designation of the scribble from the link fetched by block 331, and an $L_D$ value representing the summed distances from block 343. Block 345 inserts the link into the queue at a priority determined by the $L_D$ value of the new link.

Distance addition and the priority queue cause stage 140 to calculate intrinsic distances outwardly from the scribble areas in an efficient manner, starting with image pixels that are most affected by the scribble, and terminating the propagation as soon as one of the tests in blocks 332-334 finds that the scribble would no longer contribute any significant amount to the blend for a given image pixel.

Blocks 350 calculate distance if the neighbor pixel lies within a scribble of the measurement class. Block 351 determines whether the image pixel location lies within a measurement scribble. If so block 352 calculates an altered local distance according to the kind of the measurement scribble by calling the kind's predefined measurement function to generate the altered local distance. As discussed previously, measurement scribbles may be of several different kinds.

FIG. 4 illustrates a representative implementation for blending stage 150, FIG. 1. In this example, stage 150 also converts intrinsic distances to blend weights. Stage 150 receives the blend structures of all image pixels from stage 140.

Block 410 traverses each image pixel in the input image as a subject pixel. Blocks 420 process individual scribble kinds in the pixel's blend. By the beginning of stage 150, all scribbles are of the effect class, because stage 130 has converted preprocessing scribbles into effect scribbles, and measurement scribbles are never added to the blend. As noted above, result data scribbles are actually a sub-class of the effect-scribble class, and are treated the same in stage 150.

Blocks 420 process the scribbles that are contained in the blend structure for the current pixel selected at block 410. Block 421 selects in turn each scribble kind that is present in the blend structure of the current pixel. Block 422 then executes the predefined function that generates the effect of that kind of scribble. For example a simple color scribble produces a chrominance value matching that of the color scribble itself. A style scribble function may insert a color, intensity, or other attribute taken from a stored pattern for that style. A palette scribble function selects a color out of a palette according to the intensity of the original image or according to the type of region being processed, such as a library of colors for a tree or for the sky. The palette can be fixed or variable (dynamic), for example for movie colorization. A blur scribble function may mix original colors from nearby image-pixel locations.

Block 423 converts the intrinsic distance of the current scribble kind to a blend weight using a predefined weighting function, such as described above under the definition of "blend weight."

When all scribbles have been processed in blocks 420, block 421 transfers control to block 430. This block normalizes the blend weights of the current pixel. Dividing each one by the sum of all of them is a convenient way to normalize the weights. For example, if a certain image pixel is affected by a green, a brown, and a mauve scribble with respective weights 5, 15, and 30, then the mix of colors for that pixel would be 10% green, 30% brown, and 60% mauve. Block 440 then applies the blend to the current pixel, and 410 selects another current pixel until all pixels in the input image have been blended.

FIG. 5 shows example code for a simple but efficient calendar queue that we have named the "untidy priority queue." Although it does not guarantee strict accuracy in the ordering, it operates at high speeds with errors small enough to be not generally noticeable in an image. When combined with a local distance function that employs Manhattan distance and integer luminosity values (say, in the range of 0-255), present-day personal computers may be able to execute algorithm 100 interactively: that is, at user interaction rates that are common practice for image and video manipulation software. This combination produces only integer values of derivatives in the Manhattan directions and thus has only integer values of intrinsic distance. Because distances remain integers, only fast integer arithmetic is required, and queue priorities need not be quantized. Using this implementation therefore leads to a fast realization of the invention. If higher accuracy is needed, floating point or real arithmetic can be used, combined with quantization of the queue priorities; this would lead to a slower implementation but still at interactive rates.

Figure 6:
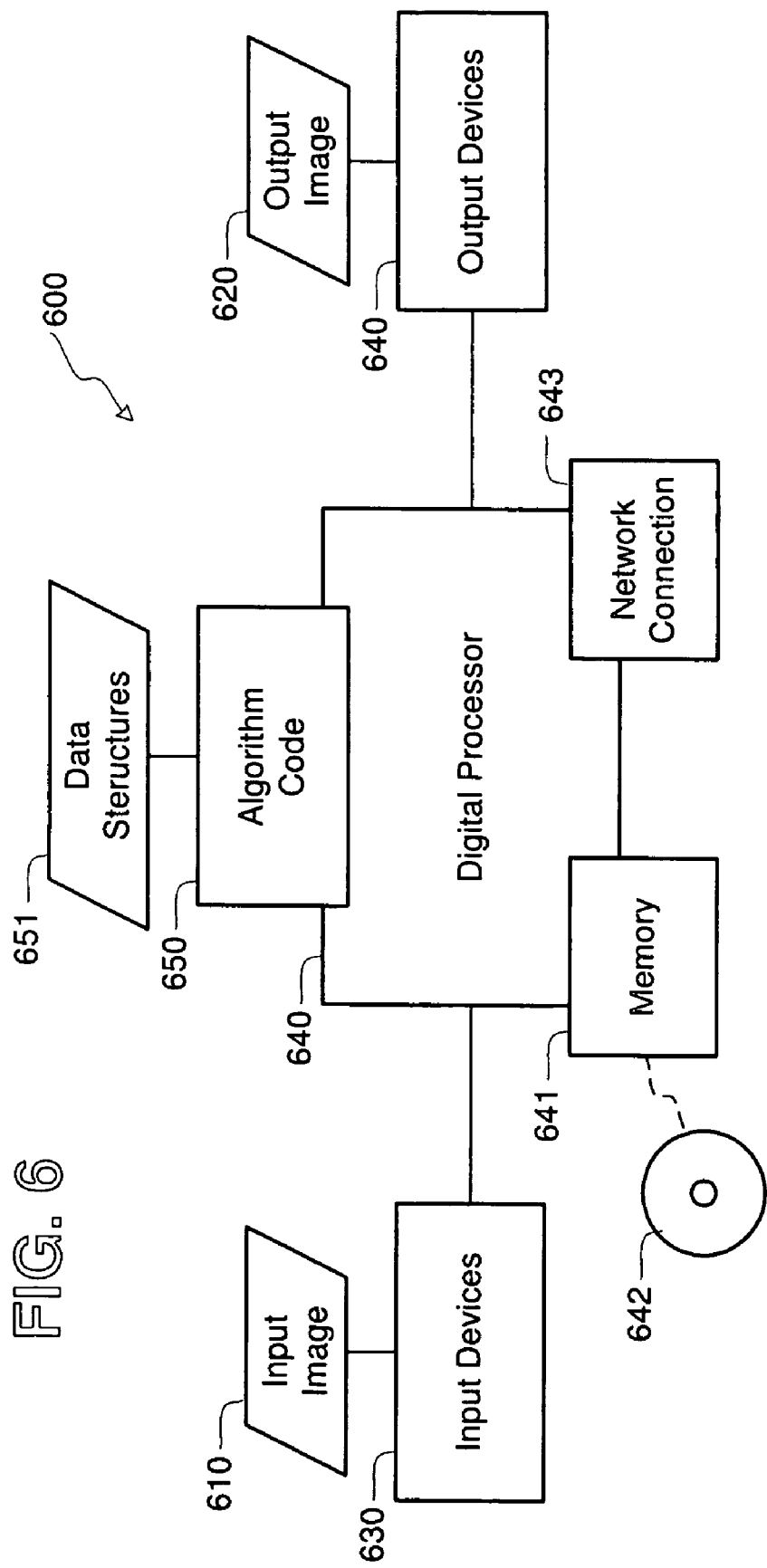
FIG. 6 is a high-level block diagram of a computer system for transforming an input image into a result image.

FIG. 6 illustrates representative components of a data-processing system 600 for transforming an input image 610 into a processed final image 620. Input devices 630 may include devices for entering input images, scribble designations and locations, and other parameters and function definitions into programmable digital processor 640. Output devices 650 may include devices for displaying both the input and final images, and for communicating the final image. Processor 640 may include memory 641 for both internal and external data, the latter being represented as removable medium 642. Network connection 643 may couple processor 640 to other units via a medium such as a local area network or the internet.

Media 643 may hold or transfer code and data for implementing algorithm or method 650. Algorithm 650 utilizes data structures 651, such as the blend structure and priority queue described above.

IMAGE EXAMPLES

FIGS. 7-11 illustrate examples of image manipulation using the described methods implemented in C++ as a stand-alone application running under the Windows® 2000 operating system, from Microsoft Corp. The hardware platform used Pentium® III processor from Intel Corp, and 512 MB of memory. Measured times do not include loading the image into memory.

Figure 7A:
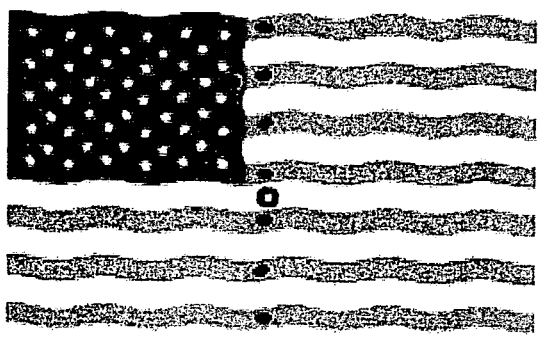
Figure 7B:
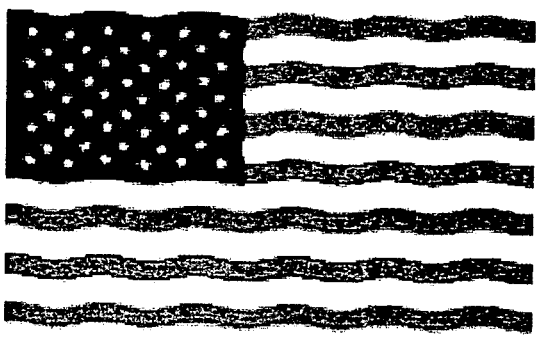
Figure 7C:
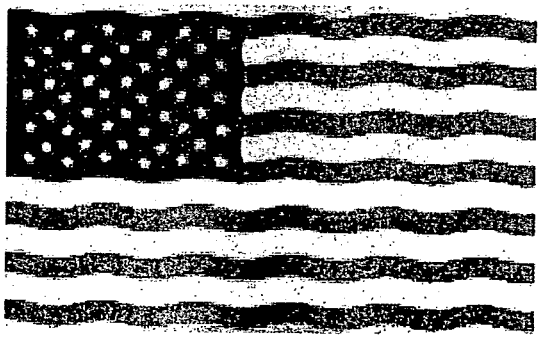
Figure 7D:
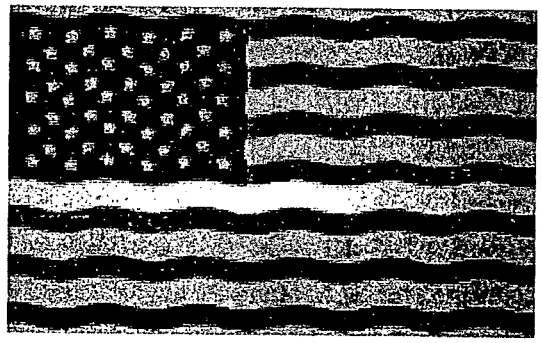

FIG. 7A is a 400×240 pixel black-and-white image of a flag having user-added scribbles. The single blue scribble is located just to the southeast of the right-hand star in the second row. The single white scribble is outlined in black to make it visible in the image. FIG. 7B shows the flag of FIG. 7A colorized according to a method of the present invention. FIG. 7C shows the flag of FIG. 7A colorized according to a publicly available prior-art package that operates according to Levin, et al., "Colorization Using Optimization," ACM SIGGRAPH 2004 Conference Proceedings, 2004, pp. 689-694 using their supplied fast implementation. Levin's algorithm minimizes the difference between a pixel's color and a weighted average color of its neighboring pixels; the luminance channels provides the weights. The minimization is optimized subject to constraints provided by the user-supplied chrominance scribbles. FIG. 7D shows the same flag colorized with the same prior-art algorithm, but with a supplied slower but more accurate implementation also supplied by the authors. Colorization time for a similar but more complex image was 1.20 sec. for the present technique, and 22.8 sec, for Levin's fast implementation. Levin's slower algorithm required a much longer time, yet did not significantly improve quality.

FIG. 8A is a more complex black-and-white image of a mascot including a relatively small number of chrominance scribbles. FIG. 8B shows the resulting colorized image, illustrating the simplicity of the present invention. Execution time was approximately 7 μsec/pixel.

FIG. 9A shows frames 1, 4, 7, and 10 of a ten-frame video cartoon sequence, where the fourth frame includes user-supplied chrominance scribbles. FIG. 9B shows the corresponding four frames where all ten frames have been colorized from the scribbles in a single one of the frames. Colorization using the present technique was achieved quickly from a small number of scribbles without requiring any optical-flow or similar algorithms for propagating color from one frame to other frames. Optical flow could be incorporated, however, if motion is too fast to be followed by weighted distances alone.

FIG. 10A shows a color image of an individual and a character. This image includes both chrominance scribbles and neutral (white) scribbles, indicating where original colors should be maintained. FIG. 10B shows the image of FIG. 10A after recolorization.

FIG. 11A is a black-and-white image of a butte taken from behind a rock cleft. The image has a large depth of field, where both the near foreground and the far background are in sharp focus. A user-supplied azalea scribble indicates where a blurring filter effect is to be applied; the white scribble signifies an image area to be protected from blurring. FIG. 11B shows the image after the blurring effect has been applied according to intrinsic pixel distances from the colored scribble, as limited by the protective white scribble.

CONCLUSION

The foregoing description and drawing illustrate certain aspects and embodiments sufficiently to enable those skilled in the art to practice the invention. Other embodiments may incorporate structural, process, and other changes. Examples merely typify possible variations, and are not limiting. Portions and features of some embodiments may be included in, substituted for, or added to those of others. Individual components, structures, and functions are optional unless explicitly required, and operation sequences may vary. The word "or" herein implies one or more of the listed items, in any combination, wherever possible. The required Abstract is provided only as a search tool, and is not to be used to interpret the claims. The scope of the invention encompasses the full ambit of the following claims and all available equivalents.

We claim as our invention:

1. A method for manipulating an original image having pixels, comprising:
   designating a measurement medium for the image;
   receiving a plurality of scribbles in a blending medium at certain locations of the image;
   calculating intrinsic distances from respective ones of the scribbles to other pixels in the image, the intrinsic distances being a function of the measurement medium;
   propagating the scribbles to at least some of the pixels of the input image according to the intrinsic distances of the some pixels, to produce result data in the blending medium;
   producing, using a processor executing an algorithm, a final image having pixels blended in the blending medium according to the scribbles.

2. The method of claim 1 where at least some of the scribbles are effect scribbles that produce result data in the blending medium according to a defining function.

3. The method of claim 1 where the measurement medium is a luminance channel of the original image.

4. The method of claim 3 where the intrinsic distance is related to gradients in the measurement medium.

5. The method of claim 1 where the blending medium is a chrominance channel.

6. The method of claim 1 where the blending medium is a data channel not present in the original image.

7. The method of claim 1 where one of the scribbles is a preprocessing scribble, further comprising:
   convening the preprocessing scribble to an effect scribble;
   propagating an effect of the effect scribble according to intrinsic distances from the effect scribble to at least some of the pixels of the image.

8. The method of claim 1 where one of the scribbles is a neutral scribble, further comprising masking an effect of at least one other scribble on certain of the image pixels in accordance with the intrinsic distances from the neutral scribble of the certain pixels.

9. The method of claim 1 where one of the scribbles is an effect filter scribble, further comprising applying a predefined function to image pixels in accordance with their respective intrinsic distances from the effect filter scribble.

10. The method of claim 9 where one of the scribbles is a measurement scribble, further comprising altering the intrinsic distances according to a defining function for the measurement scribble.

11. The method of claim 1 further comprising weighting the intrinsic distances according to a weighting function.

12. The method of claim 11 where the weighting function
   has a very high value for very small intrinsic distances,
   has a very low value for very large intrinsic distances,
   has substantially the same value within a large neighborhood of values of very large intrinsic distances.

13. The method of claim 1 where
   the original image is a sequence of video frames,
   the scribbles are applied to less than all of the frames;
   further comprising propagating the blending medium to all of the frames in the sequence.

14. A computer readable medium containing instructions and data for carrying out on a digital computer the method of:
   designating a measurement medium for the image;
   receiving a plurality of scribbles in a blending medium at certain locations of the image;
   calculating intrinsic distances from respective ones of the scribbles to other pixels in the image, the intrinsic distances being a function of the measurement medium;
   propagating the scribbles to at least some of the pixels of the input image according to the intrinsic distances of the some pixels, to produce result data in the blending medium;
   producing a final image having pixels blended in the blending medium according to the scribbles.

15. The medium of claim 14 where the measurement medium is a luminance channel of the original image.

16. The medium of claim 14 where the blending medium is a chrominance channel.

17. A system for manipulating an original image, comprising:
   an input device for receiving an original image having pixels,
   a memory for storing
      a plurality of scribbles at user-specified locations of the image, a designation of a measurement medium of the image, blending structures for at least some of the pixels specifying blends for at least some of the image pixels, a queue containing links for the some pixels, each link containing a location of one of the pixels, a designation of a scribble, and an intrinsic distance of the scribble from the one pixel, the links having priorities in the queue according to their intrinsic distances;

a processor for calculating intrinsic distances along the measurement medium of the scribbles from at least some of the image pixels, for accessing the queue in priority order to create the blend structures, for applying the blend structures to the some pixels to produce a final image.

18. The system of claim 17 further comprising a graphic display device for displaying the original image.

19. The system of claim 18 where the graphic display device receives the scribbles from a user.

20. The system of claim 17 further comprising an output device for displaying the final image.

21. The system of claim 17 where the intrinsic distances are represented as integers.

22. The system of claim 17 where the queue is an untidy priority queue.

23. The system of claim 17 where at least one of the blend structures contains weighted blends of a plurality of the scribbles.

* * * * *

UNITED STATES PATENT AND TRADEMARK OFFICE
CERTIFICATE OF CORRECTION

PATENT NO. : 7,672,509 B2  Page 1 of 1
APPLICATION NO. : 11/415804
DATED : March 2, 2010
INVENTOR(S) : Liron Yatziv et al.

It is certified that error appears in the above-identified patent and that said Letters Patent is hereby corrected as shown below:

In Sheet 4 of 9, Reference Numeral 651, in Figure 6, line 2, delete "Steructures" and insert -- Structures --, therefor.

In column 16, line 14, in Claim 7, delete "convening" and insert -- converting --, therefor.

In column 16, line 65, in Claim 17, after "storing" insert -- : --.

Signed and Sealed this

Twenty-fifth Day of May, 2010

David J. Kappos
*Director of the United States Patent and Trademark Office*